UNITED STATES PATENT OFFICE.

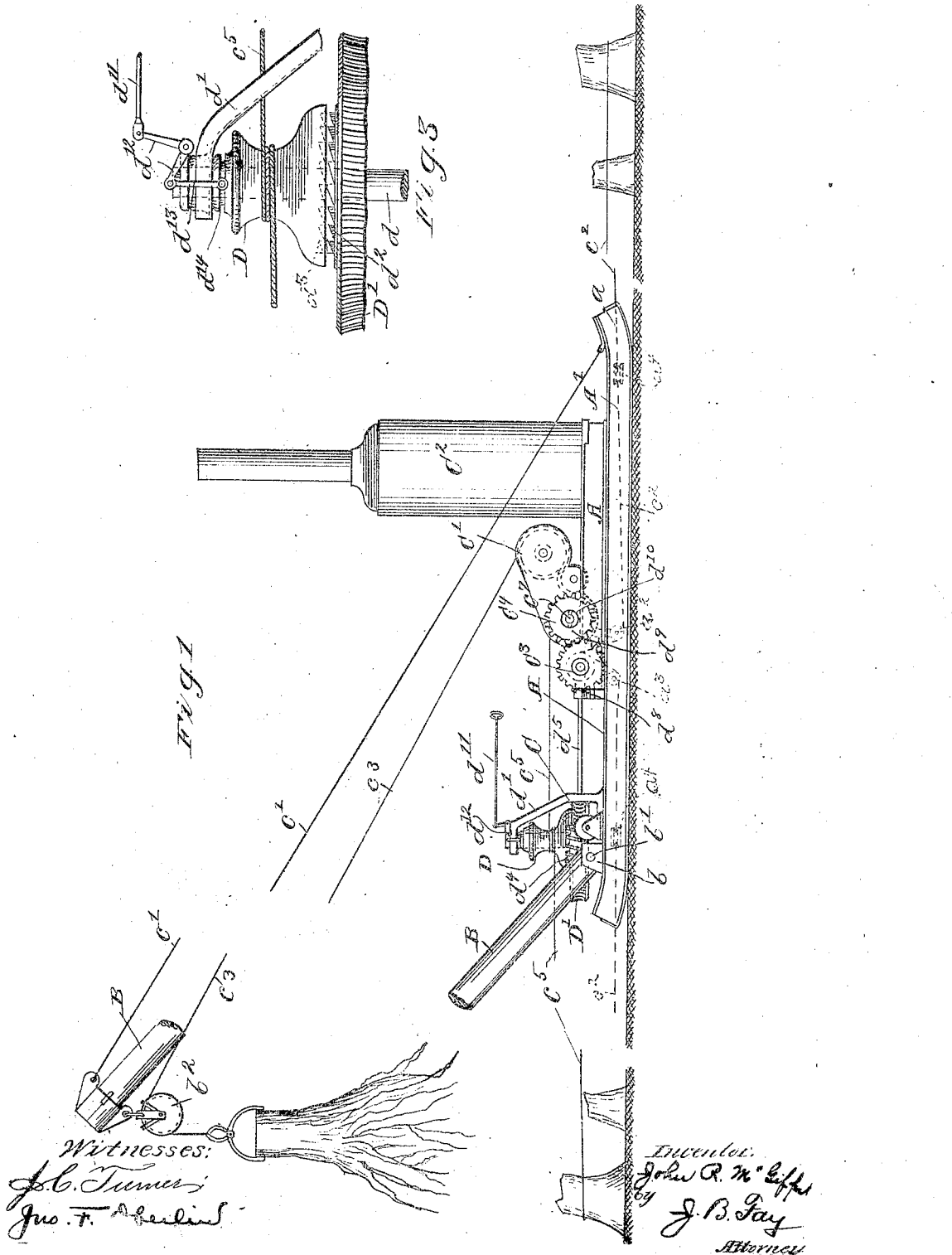

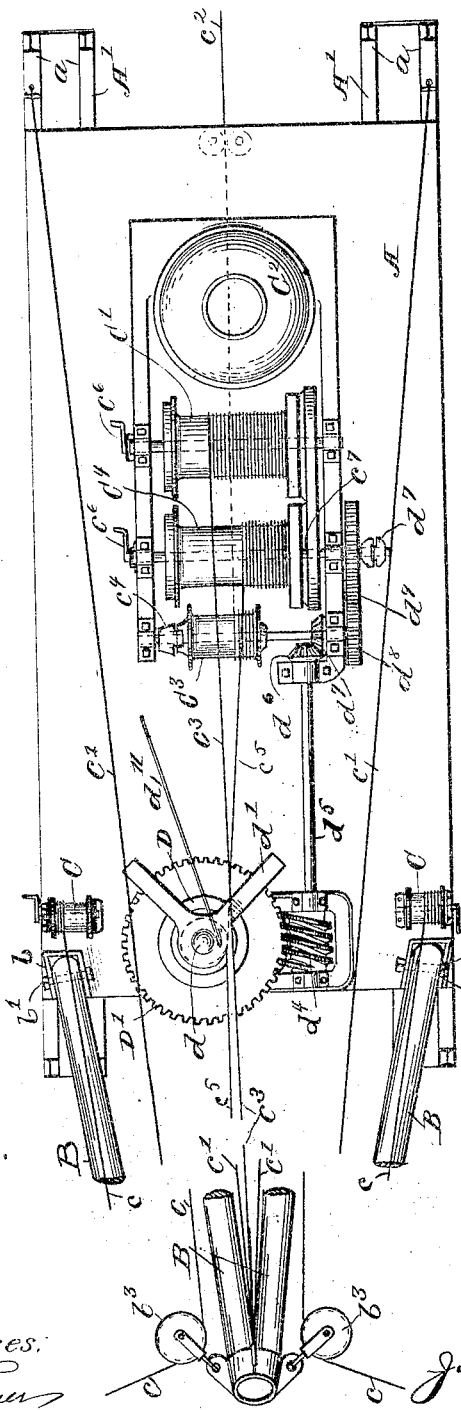

JOHN R. McGIFFERT, OF DULUTH, MINNESOTA, ASSIGNOR TO CLYDE IRON WORKS, OF DULUTH, MINNESOTA, A CORPORATION OF MINNESOTA.

LAND-CLEARING MACHINE.

1,095,122.      Specification of Letters Patent.      Patented Apr. 28, 1914.

Application filed February 10, 1909. Serial No. 477,097.

*To all whom it may concern:*

Be it known that I, JOHN R. McGIFFERT, a citizen of the United States, and a resident of Duluth, county of St. Louis, and State of Minnesota, have invented a new and useful Improvement in Land-Clearing Machines, of which the following is a specification, the principle of the invention being herein explained and the best mode in which I have contemplated applying that principle, so as to distinguish it from other inventions.

The present invention relates in general to improved mechanism for clearing land, and particularly land that has been deforested but is as yet uncleared of the stumps and other debris remaining thereon.

To this end, such invention comprises means designed for pulling stumps and also for gathering the stumps and piling them in heaps for burning, as well as thus gathering and piling such other rubbish as may remain on uncleared land.

As will be obvious, it is necessary in pulling the stumps to use a very strong cable operated by mechanism geared for a very intense pull at slow speed. When, however, they are pulled out of the ground, a lighter cable run at a much higher speed is desirable for skidding them in and piling them, if the operation is not to be unduly prolonged. Not only is it thus desirable, where the best results are to be accomplished, that the gathering and piling line, or lines, should be operated at a much higher speed than the line that is used for extracting the stumps, but a very considerable amount of time may also be saved by varying the speed of the stump-pulling line; for when such stump-pulling line or cable is attached to a stump, a very intense initial power is required to loosen it. For example, with the average stump it takes a stress of from 50,000 to 60,000 pounds to start the stump, and move it, for say, two feet, whereas after it has been thus loosened, the power required is very much less, although the stump still must be pulled 10 or 15 feet in order to remove it from the hole, and prevent its falling back into its original position, when the cable is released.

The object of the present invention is the provision, then, of a machine adapted to fulfil the requirements of the operation as just described.

It will scarcely need to be stated that, of course, the machine may, with equally good results, be employed in other fields than the particular one just described, where the requirements are of an analogous nature, namely, that a very intense stress be secured on a cable for a short time, and then such cable be drawn in more rapidly for some distance under a lighter load. While this condition is particularly characteristic of the operation of stump pulling, it is to be presumed that the same conditions may be found elsewhere, as for example, in pulling loose an anchor, and then hoisting it into a vessel.

To the accomplishment of the foregoing and related objects, said invention, then, consists of the means hereinafter fully described, and particularly pointed out in claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of my improved stump-pulling machine; Fig. 2 is a plan view of the same; and Fig. 3 is a side elevational view, on a somewhat larger scale, of a feature of construction characterizing said machine.

The frame of the machine, is preferably in the form of a base suitable for sliding over the ground. The details of construction of such base, forming as they do, no part of the present invention, need be but briefly noted, and the base may hence be considered for present purposes, as consisting of two runners A' built up of longitudinally extending beams *a* upon which is mounted the deck A that in turn supports the boom, engine, and several winding drums, all as will now be set forth. The boom B is of A-form, the ends of its legs being stepped into sockets *b* at the forward end of the deck where they are pivotally retained by pins $b'$ in the usual fashion. From the peak of said boom is hung a skidding block $b^2$, Fig. 1, and also other blocks $b^3$ (shown in Fig. 2 only) through which pass the guy lines $c$, the outer ends of the latter being attached to trees or other suitable fixed objects on each side of the machine in order to prevent the latter from tilting when drawing in the loosened stumps or other objects, by means of the skidding line $c^3$. The inner ends of these guy-lines are wound upon drums C disposed adjacent to the sockets $b$, wherein as has been stated, the ends of the boom are stepped. Holding lines $c'$ are also run from the peak of the boom to the respective rear corners of the machine base, where they are fixedly secured.

For working the skidding line $c^3$ a drum C' is provided in connection with the engine $C^2$, such drum being located directly in front of the latter, and being operated by friction clutch (not shown) in the usual fashion. In addition to such drum for the skidding line, I provide a drum $C^3$ for moving or spotting the machine. The spotting cable $c^2$ from this drum, (see Fig. 1) is adapted to be carried either forwardly or to the rear by being passed under one or the other of rollers $a^2$ $a^3$ in the machine base, and then through between pairs of guide sheaves $a^4$ near each end of such base. The spotting drum is thrown into gear with the engine when desired, by means of a jaw-clutch $c^4$, while the rear drum C' of the engine, together with drum $C^4$, for the stump-pulling line or cable $c^5$, are regular friction drums, which are operatively secured to their respective driving shafts by regular friction clutch devices of the usual construction. Of such devices, actuating levers $c^6$ alone are shown in the drawings.

Mounted upon the forward end of the deck, substantially between the lower ends of the boom, is yet another drum D vertically disposed and formed like a capstan. The shaft $d$ upon which such drum is mounted, is securely supported in its vertical position, by means of a frame-work $d'$, and said drum has a limited reciprocable movement upon said shaft in addition to being rotatable thereabout. Similarly rotatably mounted upon shaft $d$ and below the drum, is a member D' for driving the same, said member having inclined teeth $d^2$ on its upper face that are adapted to engage oppositely inclined teeth $d^3$ on the under face of the drum, Fig. 3. The disposition of such teeth is such that when member D' is turned in a direction opposite to the hands of a clock, engagement will be had with the drum, while the latter will still be left free to rotate in the same direction at a higher rate of speed than said member if desired.

Positive rotation of member D', and of the drum when connected therewith, is secured by providing the member with worm-teeth, so as to constitute the same, in effect, a worm gear with which a worm $d^4$ upon a longitudinally extending shaft $d^5$ is adapted to mesh. Such shaft is in turn driven from the same driving shaft $c^7$ upon which drum $C^4$ is mounted, through bevel gears $d^6$ $d^7$ spur gears $d^8$ $d^9$. Of the latter the one $d^9$ mounted on shaft $c^7$ may be fixedly secured thereto by a jaw clutch $d^{10}$ when occasion requires, as will be readily understood.

In addition to being thus automatically disengaged from the worm gear when rotated at a higher rate of speed than said gear, capstan-drum D may be positively raised out of said engagement, by means of an operating rod $d^{11}$ connected at its forward end with a bell crank $d^{12}$ that is mounted in frame $d$ supporting the drum shaft, the one arm of said crank being bifurcated and provided with links $d^{13}$ that project downwardly through slots in the frame to engage a groove $d^{14}$ in the upper hub of the drum. By drawing back rod $d^{11}$, accordingly, the drum may be raised from engagement with teeth $d^2$ of the worm wheel D', or when it is automatically thrown out of such engagement, it may be held in suspension, by holding or locking such rod in its retracted position.

The inner end of the stump-pulling cable or line $c^5$ is wound upon drum C and, as it passes thence, is wound two or three times around the vertical drum D, two turns being ordinarily sufficient to give the required amount of friction necessary to permit said vertical drum or capstan to impart a pulling effect on the line when desired. It will accordingly be seen that by reason of the connection between said two drums, either the cable in question may be drawn in at a high rate of speed, by directly connecting drum $C^4$ with its driving shaft $c^7$ (the vertical drum in such case being simply an idler), or said cable may be drawn in by the vertical drum at a lower rate of speed, and with a very intense pull, by reason of the reduction gearing connecting the same with said driving shaft. In the latter case, a slight pressure is made on the friction clutch of drum $C^4$, so as to maintain a sufficient tension on the line back of the vertical drum to create the necessary friction on said vertical drum to prevent the cable from slipping, as also to wind up the tail line.

From the foregoing description of the construction of my improved stump pulling machine, and of the operation of certain of its parts, the general mode of operation and use of the machine will readily appear. To move the machine from one point to another, the spotting cable is drawn out through the corresponding end of the base and attached to a stump, tree, or other fixed object; then by winding in said cable, the machine will be drawn in a corresponding direction. This will ordinarily be backwardly over the land to be cleared. To set up the machine for operation in successive locations, the guy lines over the end of the boom, are run out, their free ends similarly fixedly secured, and then the lines drawn taut by winding in the corresponding guying drums. The stump-pulling line $c^5$ may now be utilized to pull any stumps located within the radius of action of the machine, by paying out the line, attaching it to the desired stump, and then winding in the line. In the initial stage of such winding operation the line is drawn in by means of power transmitted through said drum D, the other drum $C^4$ being employed simply to wind up the inner end of the cable and to pull sufficiently to create the required amount of friction on the first-named drum. Just as soon, however, as the strain becomes so far decreased that the power transmitted through drum $C^4$ direct is sufficient to draw in the cable, the friction clutch is thrown in tight on said drum by operating lever $c^6$, causing the cable to be drawn at the speed of said drum which, for example, may be 15 or 20 times faster than that of drum D. It is obvious that as soon as the cable is pulled in at this higher speed, the forward drum will be revolved much more rapidly than the worm-wheel that has thus far been driving it, and will thus disengage itself from said worm-wheel, and revolve freely upon its shaft, acting simply as an idler. When drum D thus rotates at the higher speed, as also when the line is being paid out in order to be attached to the stump, rod $d^{11}$ should be locked so as to hold the drum out of engagement with gear D'. While the stump-pulling cable is being employed in this fashion, the skidding line may be used to gather in, and pile at the front end of the boom, the stumps thus pulled, together with such other debris as encumbers the land on either side and to the front of the machine. As the latter is moved backward across the tract of land, a high windrow of stumps will be formed. The machine is turned around when it reaches the edge of the tract, and is then worked backwardly parallel to its first course, at a distance therefrom that will depend on the amount and character of the material to be gathered and piled. It will, of course, be understood that when the material on the ground is relatively sparse, such material may be gathered in from a greater distance than where it is thick. I should also call attention to a further advantage arising from the manner in which I wind in the pulling cable, namely, that piling of the cable on the primary pulling drum, in this case vertical capstan D, is entirely avoided and the wear to which the cable is subjected much reduced.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In mechanism of the class described, the combination of a horizontal shaft; a drum mounted thereon; clutch for securing said drum to said shaft; a vertical shaft; another drum mounted on said vertical shaft; a cable passing in succession around said vertically disposed drum and said horizontally disposed drum; a driving member rotatable upon said vertical shaft below said vertically disposed drum, and adapted to positively engage therewith and rotate the same to wind in said cable at a predetermined speed, said drum being normally held in such engagement by gravity but being free to rotate at a higher speed independently of said member; and operating connections between said horizontal shaft and said member whereby said shaft may rotate the drum mounted thereon to wind in said cable at a higher rate of speed than said vertically disposed drum, whereby a continuously operative winding means is provided for said cable, the speed of the winding being automatically varied to suit the conditions.

2. In mechanism of the class described, the combination of a horizontal shaft; a drum mounted thereon; a friction clutch for securing said drum to said shaft; a vertical shaft; another drum mounted on said vertical shaft; a cable passing in succession around said vertically disposed drum and said horizontally disposed drum; a toothed member rotatable upon said vertical shaft below said vertically disposed drum, and adapted to positively engage therewith and rotate the same to wind in said cable at a predetermined speed, said drum being normally held in such engagement by gravity but being free to rotate at a higher speed independently of said member; and gearing connecting said horizontal shaft with said member whereby said shaft may rotate the drum mounted thereon to wind in said cable at a higher rate of speed than said vertically disposed drum, whereby a continuously operative winding means is provided for said cable, the speed of the winding being automatically varied to suit the conditions.

Signed by me this 4th day of February, 1909.

JOHN R. McGIFFERT.

Attested by:
C. A. LESTER,
J. J. LUMM.